United States Patent
Azema (10) Patent No.: US 6,392,172 B1
(45) Date of Patent: May 21, 2002

(54) PRESSURE-SENSITIVE BREAKER FOR BATTERY

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 85 days.

(21) Appl. No.: 09/643,509

(22) Filed: Aug. 22, 2000

(30) Foreign Application Priority Data

Aug. 23, 1999 (JP) ............................................. 11-234922

(51) Int. Cl.<sup>7</sup> .............................................. H01M 10/52
(52) U.S. Cl. ...................... 200/61.08; 200/334; 429/53; 429/56; 429/57
(58) Field of Search ............................. 200/61.08, 300, 200/334; 429/53, 56, 57, 59, 178, 179, 180, 181

(56) References Cited

U.S. PATENT DOCUMENTS

| | | |
|---|---|---|
| 5,705,290 A | 1/1998 | Azema ...................... 200/61.08 |
| 5,773,775 A | 6/1998 | Azema ......................... 429/53 |
| 5,853,912 A * | 12/1998 | Naing et al. ................... 429/61 |
| 6,284,403 B1 * | 9/2001 | Tsurutani et al. .............. 429/53 |
| 6,325,100 B1 * | 12/2001 | Han et al. ...................... 429/57 |
| 6,335,109 B1 * | 1/2002 | Takahashi et al. .............. 429/7 |

FOREIGN PATENT DOCUMENTS

JP    A1 7-335274    12/1995    .......... H01M/10/48

* cited by examiner

*Primary Examiner*—Michael Friedhofer
(74) *Attorney, Agent, or Firm*—Brinks Hofer Gilson & Lione (57) ABSTRACT

In a pressure-sensitive breaker for a battery, a recess is formed at a position on the inner surface of a battery pack opposing a side face of a battery case of a battery. A first terminal is provided to be connected to an external electrode of the battery pack, and a second terminal is provided to be connected to the battery case serving as one electrode of the battery. An electric path is formed of a conductive portion on the surface of an element, and both ends of the conductive portion are connected to the first and second terminals. Due to bending of the side face of the battery case toward the recess caused when the internal pressure in the battery rises above a predetermined value, the element is deformed toward the recess and broken, and the electric path is cut off.

8 Claims, 5 Drawing Sheets

PRESSURE-SENSITIVE BREAKER FOR BATTERY

BACKGROUND OF THE INVENTION

1. Field of the Invention

The present invention relates to a pressure-sensitive breaker for a battery, and more particularly, to a pressure-sensitive breaker for a battery used to ensure safety when the internal pressure in a battery case rises.

2. Description of the Related Art

In a chargeable lithium ion secondary battery or the like, when any abnormality is caused by overcharging or overdischarging of the battery, a large quantity of gas may be generated due to decomposition, evaporation, or the like of an electrolytic solution, and the pressure inside the closed battery case may rise. This may deform and burst the battery case, or cause leakage of the electrolytic solution.

As a countermeasure thereto, a pressure-sensitive breaker for a battery is disclosed in, for example, Japanese Unexamined Patent Application Publication No. 7-335272, in which overcharging or overdischarging of a battery can be prevented by cutting off the electric path of the battery in response to deformation of the battery case.

Figure 8:
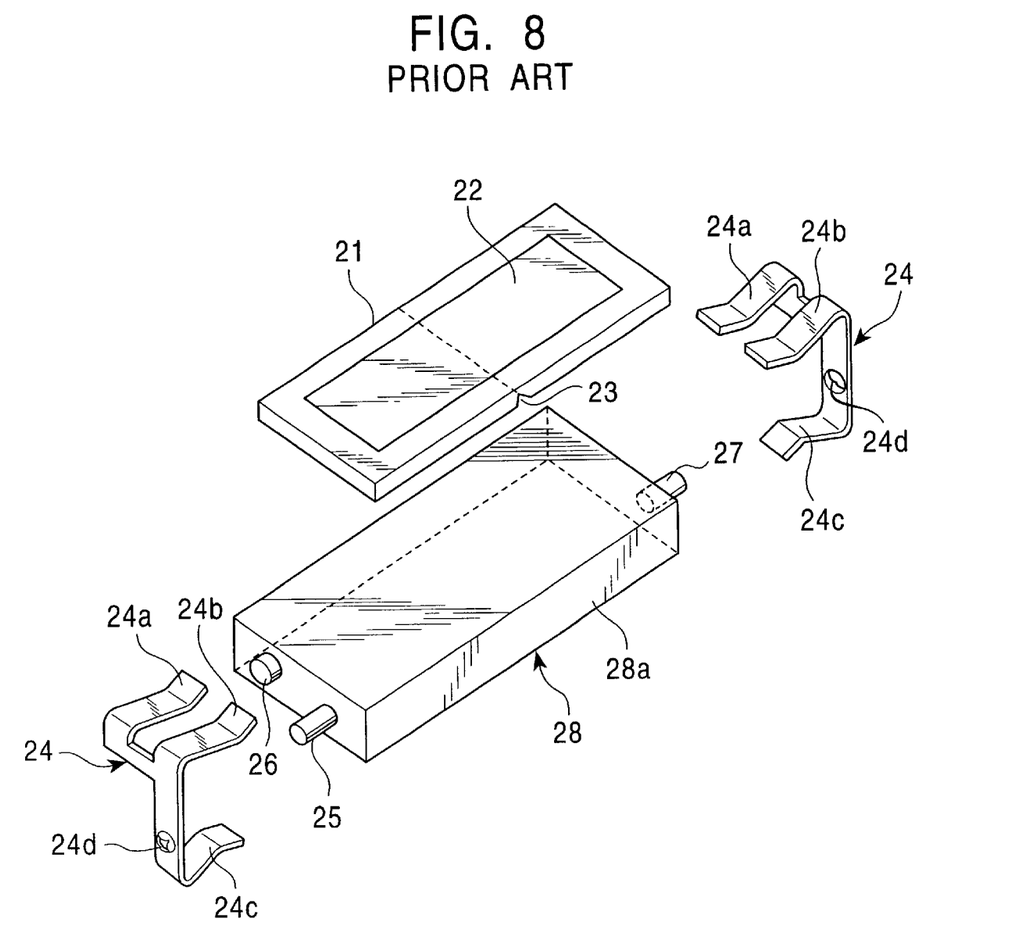
FIG. 8 is an exploded perspective view of a conventional pressure-sensitive breaker for a battery.
Figure 9:
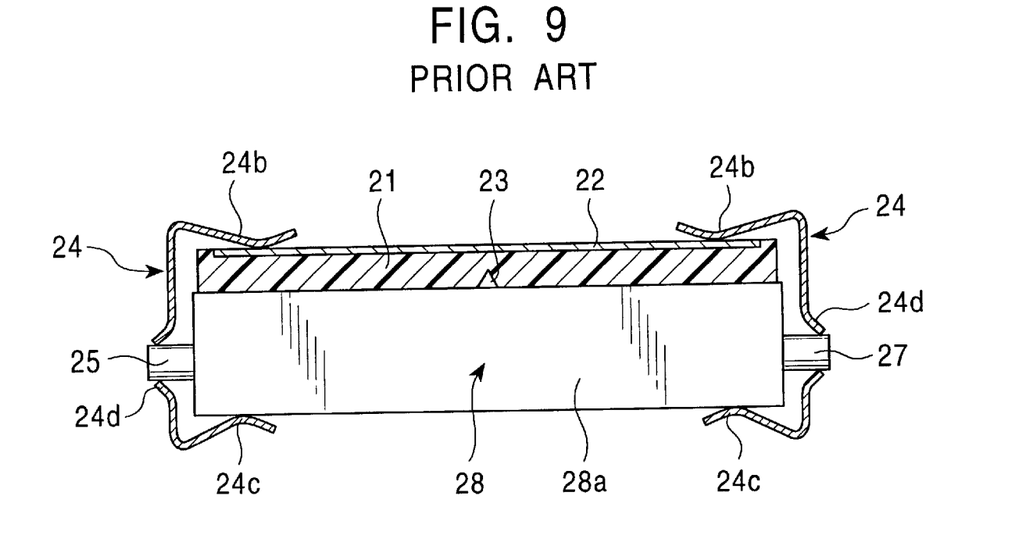
FIG. 9 is a side view of the conventional pressure-sensitive battery breaker.
Figure 10:
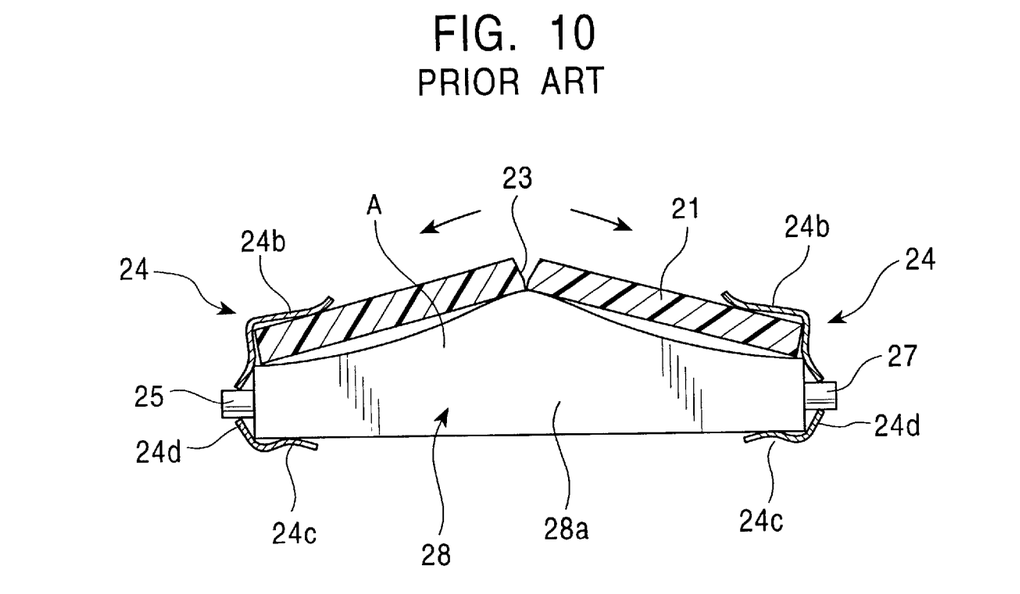
FIG. 10 is a schematic view showing the operation of the conventional pressure-sensitive battery breaker.

FIGS. 8 to 10 show the above-described conventional pressure-sensitive breaker for a battery. In the pressure-sensitive battery breaker, a ceramic substrate 21 is closely attached to a side face of a battery case 28a of a rectangular battery 28, such as a lithium ion secondary battery.

The battery 28 is covered with the battery case 28a on the periphery, as shown in FIG. 8. A first electrode 25 and a second electrode 26 project from the left side face of the battery case 28a in the figure, and a third electrode 27 projects from the right side face. Electromotive force is generated between the second and third electrodes 26 and 27.

The ceramic substrate 21 made of a fragile material and having a rectangular outline is placed on the upper surface of the battery case 28a. A conductive pattern 22 is formed by printing on the upper surface of the ceramic substrate 21, and a V-shaped groove 23 is formed across the full width on the lower surface of the ceramic substrate 21. A portion of the ceramic substrate 21 at the groove 23 is easily broken.

A pair of terminals 24 are provided to attach the battery 28 and the ceramic substrate 21 into a unit. Each of the terminals 24 is formed by bending an elastic metal plate of phosphor bronze, stainless steel, or the like, and comprises legs 24a and 24b bifurcated in elastic contact with the conductive pattern 22, a leg 24c in elastic contact with the lower surface of the battery 28, and a louver portion 24d in which the first or third electrode 25 or 27 projecting from the left or right side face of the battery case 28a is fitted. The terminals 24 are substantially angularly U-shaped overall.

When attaching the pressure-sensitive battery breaker to the battery 28, as shown in FIGS. 8 and 9, the ceramic substrate 21 is placed on the upper surface of the battery case 28a, and the terminals 24 are fitted thereon from the right and left sides in the figure by using an assembly jig (not shown), so that the battery 28 and the ceramic substrate 21 are pressed and clamped by the bifurcated legs 24a and 24b. Moreover, the first and third electrodes 25 and 27 are fitted into the louver portions 24d and are electrically connected to the conductive pattern 22 via the terminals 24.

That is, the ceramic substrate 21 is attached to the side face of the battery 28 by the terminals 24, and an electric path is formed between the first and third electrodes 25 and 27.

A description will be given of the operation of the conventional pressure-sensitive battery breaker with such a configuration. The battery 28 equipped with the pressure-sensitive battery breaker is incorporated in a portable device or the like (not shown), and the first and second electrodes 25 and 26 are used as power terminals of the portable device or the like.

When overcharging or overdischarging is performed, as described above, pressure inside the battery 28 rises, and the battery case 28a expands and deforms.

The ceramic substrate 21 is broken at the groove 23 due to deformation of the battery case 28a, as shown in FIG. 10, thereby cutting the conductive pattern 22.

The electric path between the first and third electrodes 25 and 27 is thereby cut off, the supply of electric power to the battery 28 is terminated, and expansion of the battery case 28a stops, whereby the battery 28 is prevented from bursting.

In a case in which such a conventional pressure-sensitive battery breaker is used in a low-profile and light-weight polymer lithium secondary battery or the like which has been recently sold commercially, since the battery case of the polymer lithium secondary battery is made of a flexible film formed of a laminate of aluminum foil and plastic, it is bent and deformed when the ceramic substrate 21 made of a fragile material is attached to the side face of the flexible battery case and tightly clamped by the terminals 24. This may crack the ceramic substrate 21 at the groove 23 and cut off the electric path between the first and third electrodes 25 and 27.

Furthermore, since the louver portions 24d of the terminals 24 are fitted on the first and third electrodes 25 and 27 when attaching the ceramic substrate 21 to the battery 28, a special assembly jig is required. This decreases assembly efficiency.

SUMMARY OF THE INVENTION

The present invention has been made in consideration of the above problems, and an object of the present invention is to provide a pressure-sensitive breaker for a battery with high assembly efficiency, which can be used in a polymer lithium secondary battery having a battery case formed of a laminated film or the like without any problem.

In order to achieve the above object, according to an aspect of the present invention, there is provided a pressure-sensitive breaker for a battery including a battery having a battery case for holding a power-generating element therein, a battery pack for accommodating the battery, and an element made of a fragile material, wherein a recess is formed at a position on the inner surface of the battery pack opposing a side face of the battery case, a first terminal is provided to be connected to an external electrode of the battery pack and a second terminal is provided to be connected to one electrode of the battery, a conductive portion is formed on the surface of the element, both ends of the conductive portion are connected to the first and second terminals so as to form an electric path between the first and second terminals, the element is deformed toward the recess and is broken due to bending of the side face of the battery case toward the recess caused when the internal pressure in the battery rises above a predetermined value, and the electric path is cut off by the breaking of the element.

In this case, the recess is formed on the inner surface of the battery pack, the electric path is formed of the conductive portion on the surface of the element, and both ends of the conductive portion are connected to the first and second terminals. The element is deformed toward the recess and is broken due to bending of the side face of the battery case toward the recess caused when the internal pressure in the battery rises above a predetermined value, and the electric path is cut off by the breaking of the element. Therefore, even if the battery has a low profile, when the side face of the battery case is bent, the element can be easily broken to cut off the electric path. This makes it possible to provide a high-performance and safe pressure-sensitive breaker for a battery which does not cause bursting of the battery, leakage of the electrolytic solution, and the like even when an abnormality occurs inside the battery.

Preferably, the element is supported over the recess so as to be stretched between shoulder portions disposed on both sides of the recess.

Since the battery case is deformed, the element is broken from the center on the shoulder portions, thereby reliably cutting off the electric path.

Preferably, the element is supported so that one end portion thereof is placed at one of the shoulder portions disposed on both sides of the recess and so that the other end portion is placed over the recess.

In this case, the element is cantilevered by one of the shoulder portions of the recess, and the other end portion placed over the recess serves as a free end. Accordingly, the free end can be pushed up to easily break the element even by a small amount of bending of the battery case.

Preferably, one of the first and second terminals has a U-shaped connecting portion formed by louvering at the end thereof, and the other end portion of the element placed over the recess is clamped by the U-shaped connecting portion.

Since the element and the terminal can be connected only by inserting the other end portion of the element into the connecting portion formed in one of the first and second terminals, it is possible to provide a pressure-sensitive breaker for a battery with high assembly efficiency.

A part of the first terminal or/and the second terminal may be embedded in the battery pack. This makes it possible to reduce the man-hours needed to mount the first terminal or/and the second terminal in the battery pack, and to thereby increase assembly efficiency.

The battery pack may have a through hole opposing a connecting portion between the first terminal or/and the second terminal, and the element. This makes it possible to connect the terminals and the element through the through hole by welding or by other means, and to provide a pressure-sensitive breaker for a battery with high assembly efficiency.

The through hole may be covered with a seal. This makes it possible to prevent dust and the like from entering the inner cavity from the outside.

Preferably, the battery and the battery pack are rectangular in outline, the recess is formed in a portion of the inner surface of the battery pack where the orthogonal line of the battery lies, and the element is placed on the orthogonal line. This makes it possible to lengthen the element to be stretched over the recess, and to thereby provide a high-performance pressure-sensitive breaker for a battery in which the element can be easily broken even by a small amount of expansion of the battery case.

Further objects, features, and advantages of the present invention will become apparent from the following description of the preferred embodiments with reference to the attached drawings.

DESCRIPTION OF THE PREFERRED EMBODIMENTS

Embodiments of a pressure-sensitive breaker for a battery according to the present invention will be described below with reference to the drawings.

Figure 1:
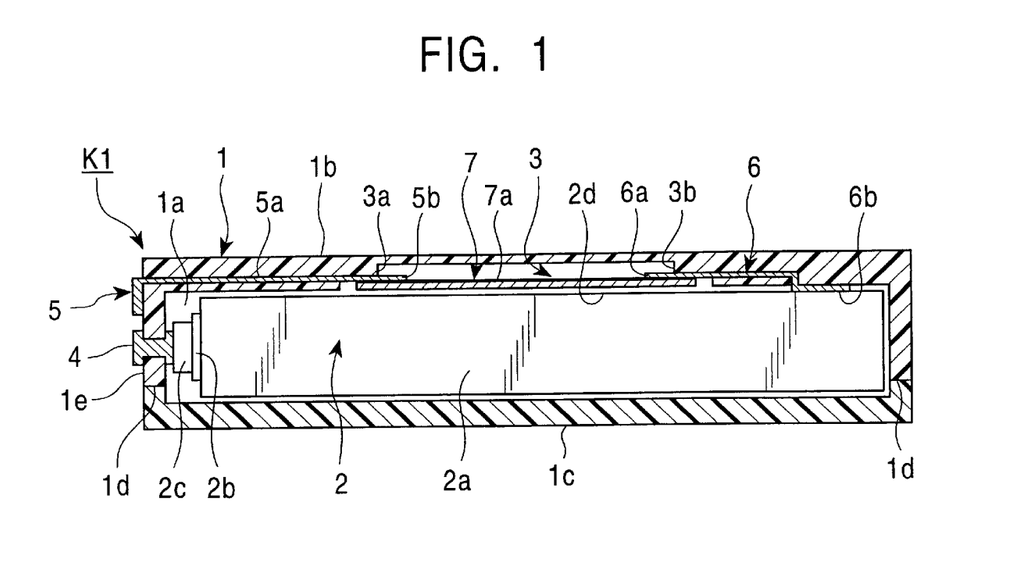
FIG. 1 is a cross-sectional view of a pressure-sensitive breaker for a battery according to a first embodiment of the present invention.
Figure 2:
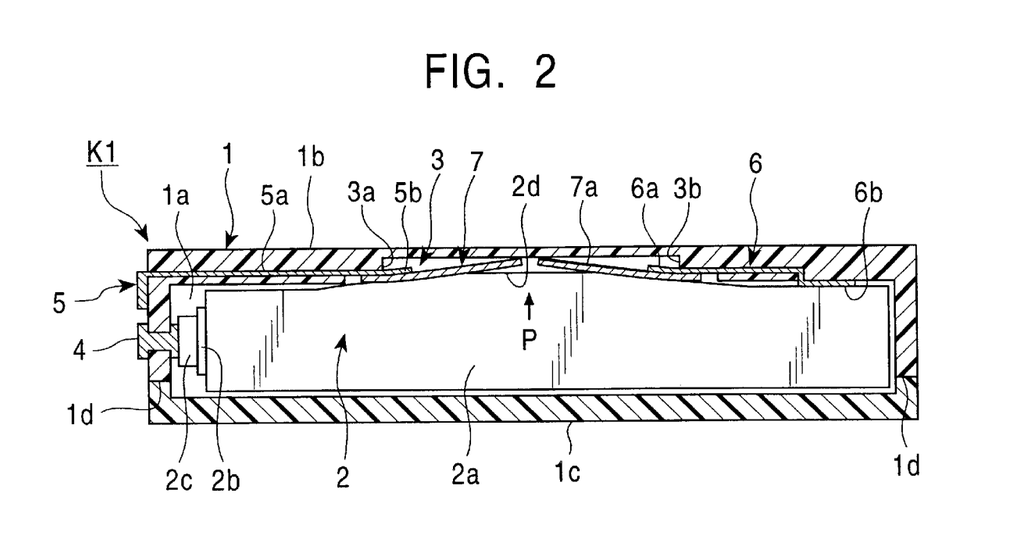
FIG. 2 is a cross-sectional view showing the operation of the breaker shown in FIG. 1.
Figure 3:
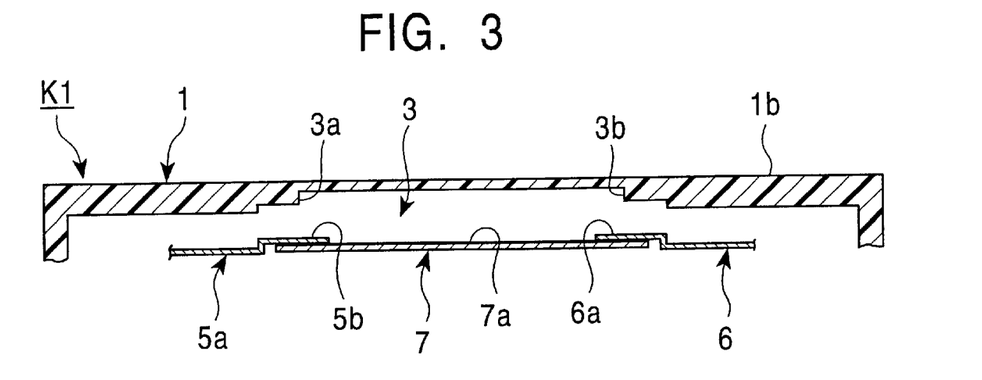
FIG. 3 is a cross-sectional view showing the principal part of a modification of the first embodiment.
Figure 4:
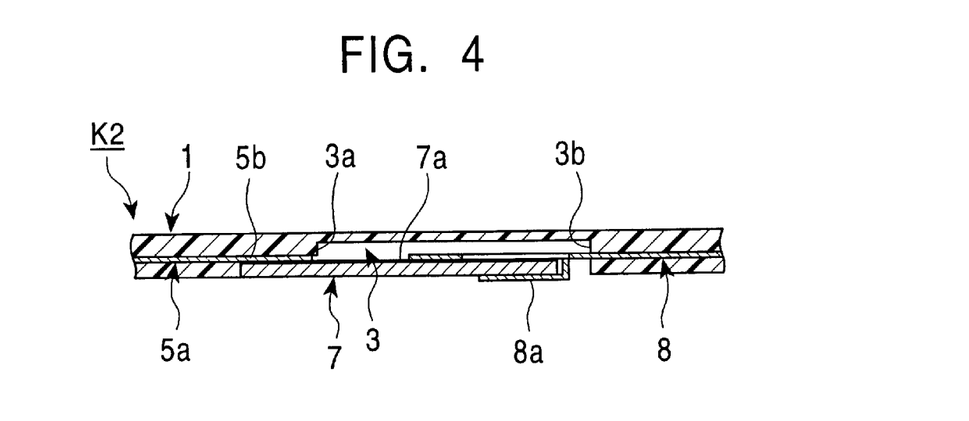
FIG. 4 is a cross-sectional view showing the principal part of a pressure-sensitive breaker for a battery according to a second embodiment of the present invention.
Figure 5:
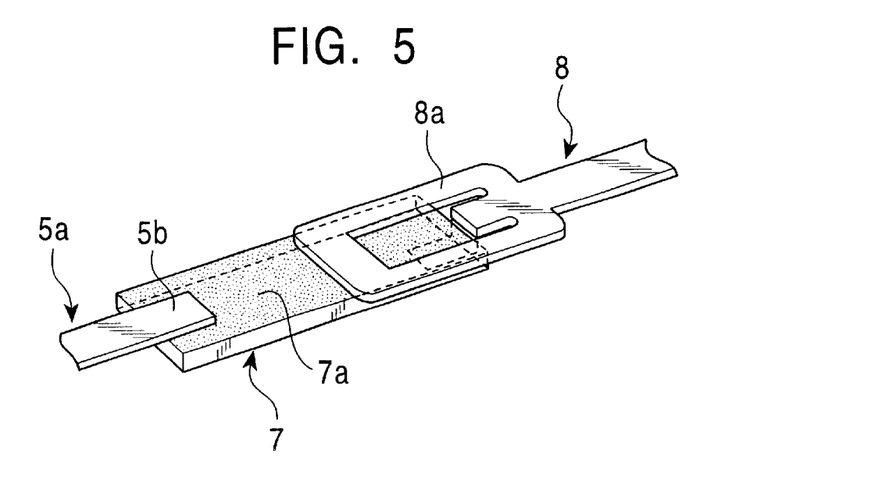
FIG. 5 is a perspective view showing the principal parts of the structures of terminals in the second embodiment.
Figure 6:
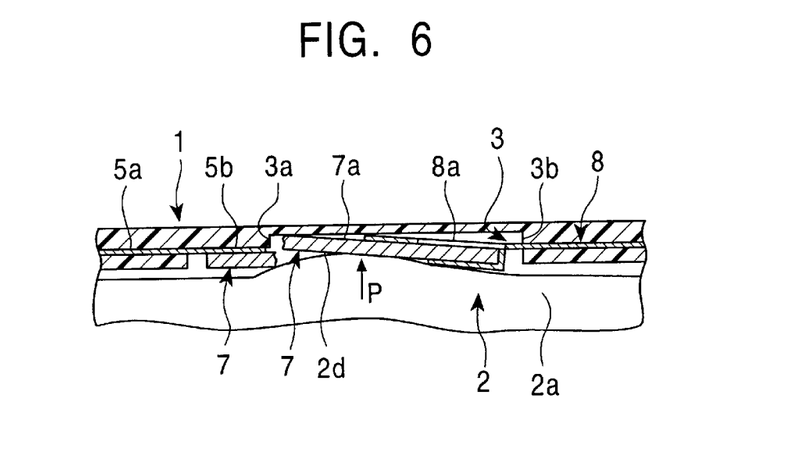
FIG. 6 is a cross-sectional view illustrating the operation of the breaker shown in FIG. 4.
Figure 7:
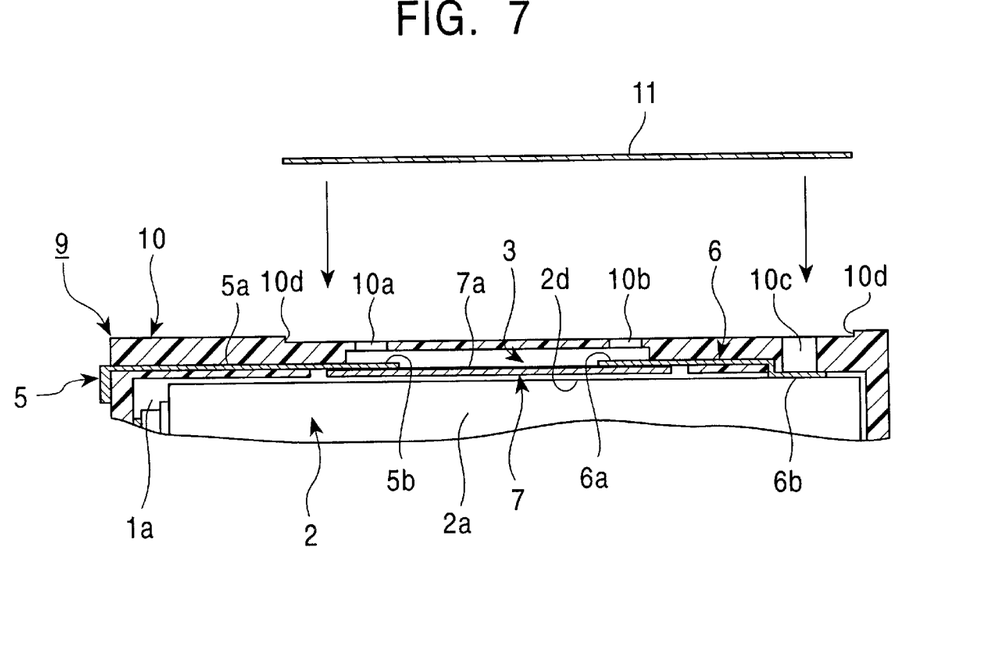
FIG. 7 is a view illustrating an assembly method according to the present invention.

FIG. 1 is a cross-sectional view of a pressure-sensitive breaker for a battery according to a first embodiment of the present invention, FIG. 2 is a cross-sectional view showing the operation of the breaker, FIG. 3 is a cross-sectional view showing the principal part of a modification of the first embodiment, FIG. 4 is a cross-sectional view showing the principal part of a pressure-sensitive breaker for a battery according to a second embodiment of the present invention, FIG. 5 is a perspective view showing the principal parts of the structures of terminals in the second embodiment, FIG. 6 is a cross-sectional view illustrating the operation of the breaker shown in FIG. 4, and FIG. 7 is a view explaining an assembly method according to the present invention.

A pressure-sensitive breaker for a battery K1 according to a first embodiment of the present invention is provided with a battery pack 1 which has a cavity 1a for accommodating a battery 2, which will be described later, and which is rectangular in outline.

Such a battery pack 1 is composed of two covers, a first cover 1b and a second cover 1c. The cavity 1a for accommodating the battery 2 is formed by bonding the first cover 1b and the second cover 1c at bonding portions 1d with an adhesive or the like.

The battery 2 to be accommodated in the cavity 1a, for example, a low-profile and light-weight polymer lithium secondary battery which has been recently sold commercially, is enclosed by a flexible and conductive battery case 2a made of a laminated film of aluminum foil and plastic. An electrolytic solution, such as a gel polymer electrolyte, a power-generating element (not shown), and the like are sealed inside the enclosed battery case 2a.

Such a polymer lithium secondary battery 2 can be produced to have a thickness of 1 mm or less.

As shown in FIG. 1, on the narrow left side face of the battery 2, a positive electrode 2c is formed via an insulating portion 2b so as to be connected to the positive side of the power-generating element inside the battery case 2a. The conductive battery case 2a is connected to the negative side of the inner power-generating element so as to serve as a negative electrode.

At a position at about the center of the inner surface of the first cover 1b of the battery pack 1, a recess 3 having a predetermined depth is formed by left and right shoulder portions 3a and 3b of a predetermined width so as to be opposed to a wide side face 2d of the battery 2 accommodated in the cavity 1a.

A first external electrode 4 and a second external electrode 5 are exposed outside from a left side face 1e of the battery pack 1 in the figure. The first external electrode 4 is connected to the positive electrode 2c of the battery 2 accommodated in the cavity 1a, and the second external electrode 5 is connected to the battery case 2a serving as the negative electrode of the battery 2.

A first terminal 5a is integrally connected to the second external electrode 5. A part of the first terminal 5a is embedded in the first cover 1b by insert molding or by another method and is mounted in the battery pack 1.

One end portion 5b of the first terminal 5a placed inside the battery pack 1 protrudes from one of the shoulder portions 3a over the recess 3 by a predetermined length.

At a position opposing the one end portion 5b of the first terminal 5a, a second terminal 6 is disposed so that one end portion 6a thereof protrudes from the other shoulder portion 3b of the recess 3 over the recess 3 by a predetermined length. A part of the second terminal 6 is embedded in the first cover 1b by insert molding or by another method and is mounted in the battery pack 1.

While both the first and second terminals 5a and 6 are embedded and mounted in the battery pack 1 in the description of the present invention, one of the first and second terminals 5a and 6 may be embedded in the battery pack 1.

That is, in the pressure-sensitive battery breaker of the present invention, the first terminal 5a and/or the second terminal 6 is embedded and mounted in the battery pack 1.

The other end portion 6b of the second terminal 6, which is partly embedded in the first cover 1b, is exposed from the inner surface of the battery pack 1. The battery case 2a, serving as the negative electrode of the battery 2 accommodated in the cavity 1a, is in contact with the other end portion 6b, thereby electrically connecting the second terminal 6 and the battery case 2a. The second terminal 6 and the battery case 2a may be connected by, for example, welding in order to form a more reliable connection.

A platelike element 7 formed of a ceramic substrate or the like made of a fragile material is attached to the end portions 5b and 6a of the first and second terminals 5a and 6 extending from the shoulder portions 3a and 3b of the recess 3 over the recess 3. The element 7 is provided with a conductive portion 7a made of, for example, silver paste, on the entire upper surface in the figure by printing or by another method.

The element 7 is supported over the recess 3 so as to be stretched between the shoulder portions 3a and 3b disposed on both sides of the recess 3. Both ends of the conductive portion 7a are connected to the end portions 5b and 6a of the first and second terminals 5a and 6 by welding or by another method, thereby establishing an electric path between the first and second terminals 5a and 6.

While the first and second terminals 5a and 6 are partly embedded in the battery pack 1 in the description of the first embodiment of the present invention, they may be attached to the element 7 and then bonded to the inner surface of the first cover 1b, for example, with an adhesive or the like, as in a modification shown in FIG. 3.

A description will now be given of the operation of such a pressure-sensitive battery breaker K1 according to the first embodiment of the present invention. When the internal pressure in the battery 2 accommodated in the cavity 1a rises above a predetermined value due to some abnormality during operation, the wide side face 2d of the battery case 2a on the side of the recess 3 expands and bends toward the recess 3, as shown by the arrow P in FIG. 2.

Due to such bending of the battery case 2a toward the recess 3, the element 7 is deformed toward the recess 3 and is broken, as shown in FIG. 2. When the element 7 is broken, the conductive portion 7a is severed to cut off the electric path between the first external electrode 4 and the second external electrode 5.

For this reason, the supply of electric power to the power-generating element (not shown) inside the battery 2 is cut off, and the rise in internal pressure in the battery stops, so that failure, such as bursting of the battery 2, is prevented.

A pressure-sensitive breaker for a battery K2 according to a second embodiment of the present invention will be described with reference to FIGS. 4 to 6. A left end portion of an element 7 is supported at one shoulder portion 3a of a recess 3 and is connected to one end portion 5b of a first terminal 5a, and the right end portion thereof is supported over the recess 3 at the end of a second terminal 8, as shown in FIG. 4.

In this case, the end portion 5b of the first terminal 5a is positioned on one of the shoulder portions 3a of the recess 3 so as not to extend over the recess 3. For this reason, when a battery case 2a of a battery 2 is bent, the element 7 is broken adjacent to the shoulder portion 3a of the recess 3.

A U-shaped connecting portion 8a is formed by louvering at the end of the second terminal 8, as shown in FIG. 5. The other end portion of the element 7 over the recess 3 is supported by being tightly clamped by the U-shaped connecting portion 8a.

In assembling the pressure-sensitive battery breaker K2 of the second embodiment, the element 7 is clamped by the U-shaped connecting portion 8a of the second terminal 8 only by inserting the other end portion of the element 7 into the connecting portion 8a of the second terminal 8, whereby the second terminal 8 and the conductive portion 7a of the element 7 are electrically connected.

In such a pressure-sensitive battery breaker K2 of the second embodiment, as shown in FIG. 6, the element 7 over the recess 3 adjacent to the shoulder portion 3a is deformed toward the recess 3 and is broken due to bending of a side face 2d of the battery 2 toward the recess 3.

While the U-shaped connecting portion 8a is formed in the second terminal 8 in the description of the second embodiment of the present invention, it may be formed at one end of one of the first and second terminals 5a and 8.

A method of connecting the element 7 to the first and second terminals 5a and 6 in the first embodiment of the present invention will be described with reference to FIG. 7.

A first cover 10 of a battery pack 9 is provided with through holes 10a and 10b opposing connecting portions between first and second terminals 5a and 6 and an element 7, and with a through hole 10c opposing a connecting portion between the other end portion 6b of the second terminal 6 and a battery case 2a.

The first and second terminals 5a and 6 and the element 7, and the second terminal 6 and the battery case 2a are welded and electrically connected, for example, by placing electrodes of a ultrasonic welding machine at the through holes 10a, 10b, and 10c.

As shown in FIG. 7, a concave seal groove 10d having a predetermined depth is formed in a portion of the upper outer side of the first cover 10 in the figure where the through holes 10a, 10b, and 10c are formed. By sticking, for example, a seal 11 for explanation on the seal groove 10d, the through holes 10a, 10b, and 10c are blocked so that dust and the like do not enter a cavity 1a from the outside.

In the second embodiment of the present invention, the battery pack 1 may also have a through hole (not shown) opposing the connecting portion between the first terminal 5a and the element 7 shown in FIG. 4. Since the end portion of the element 7 is tightly clamped and supported by the U-shaped connecting portion 8a, the second terminal 8 need not be welded, and a through hole need not be formed in a portion of the battery pack 1 opposing the connecting portion 8a.

That is, the battery pack 1 has a through hole opposing the connecting portion between the first terminal 5a or/and the second terminal 6, and the element 7.

The battery pack 1 and the battery 2 are rectangular in outline. Although not shown, the recess 3 is formed in a portion of the inner surface of the battery pack 1 where the diagonal line of the battery 2 accommodated in the cavity 1a lies, as viewed from the side face 2d.

The element 7 is placed on the diagonal line of the battery 2, and is attached to the battery pack 1 with both ends thereof connected to the first and second terminals. For this reason, even when the battery is small in outline, the element 7 to be stretched over the recess 3 can be made long. Moreover, the element 7 can be easily broken even by a small amount of expansion of the battery case 2a.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A pressure-sensitive breaker for a battery, comprising:

a battery having a battery case to hold a power-generating element therein;

a battery pack accommodating said battery; and an element made of a fragile material, wherein a recess is formed at a position on an inner surface of said battery pack opposing a side face of said battery case, a first terminal is provided to be connected to an external electrode of said battery pack and a second terminal is provided to be connected to one electrode of said battery, a conductive portion is formed on a surface of said element, ends of said conductive portion are connected to said first and second terminals to form an electric path between said first and second terminals, said element is deformed toward said recess and is broken due to bending of said side face of said battery case toward said recess caused when an internal pressure in said battery rises above a predetermined value, and said electric path is cut off by the breaking of said element.

2. A pressure-sensitive breaker for a battery according to claim 1, wherein said element is supported over said recess so as to be stretched between shoulder portions disposed on opposite sides of said recess.

3. A pressure-sensitive breaker for a battery according to claim 1, wherein said element is supported such that one end portion thereof is placed at one of a plurality of shoulder portions disposed on opposite sides of said recess such that another end portion is placed over said recess.

4. A pressure-sensitive breaker for a battery according to claim 3, wherein one of said first and second terminals has a U-shaped connecting portion formed by louvering at one end thereof, and said other end portion of said element placed over said recess is clamped by said U-shaped connecting portion.

5. A pressure-sensitive breaker for a battery according to claim 1, wherein one of a part of said first terminal and said second terminal is embedded in said battery pack.

6. A pressure-sensitive breaker for a battery according to claim 1, wherein said battery pack has a through hole opposing a connecting portion between one of said first terminal and said second terminal, and said element.

7. A pressure-sensitive breaker for a battery according to claim 6, wherein said through hole is covered with a seal.

8. A pressure-sensitive breaker for a battery according to claim 1, wherein said battery and said battery pack are rectangular, said recess is formed in a portion of an inner surface of said battery pack where an orthogonal line of said battery lies, and said element is placed on the orthogonal line.

* * * * *

UNITED STATES PATENT AND TRADEMARK OFFICE
CERTIFICATE OF CORRECTION

PATENT NO. : 6,392,172 B1
DATED : May 21, 2002
INVENTOR(S) : Tadamitsu Azema It is certified that error appears in the above-identified patent and that said Letters Patent is hereby corrected as shown below:

<u>Title page,</u>
Item [56], References Cited, U.S. PATENT DOCUMENTS, delete "6,325,100" and substitute -- 6,326,100 -- in its place.

Signed and Sealed this

Eleventh Day of March, 2003

JAMES E. ROGAN
*Director of the United States Patent and Trademark Office*